United States Patent
Acquaviva et al.

(10) Patent No.: US 7,479,755 B2
(45) Date of Patent: Jan. 20, 2009

(54) DRIVE CIRCUIT FOR A SYNCHRONOUS ELECTRIC MOTOR

(75) Inventors: Sebastiano Acquaviva, Pino Torinese (IT); Domenico Diacono, Asti (IT)

(73) Assignee: Emerson Appliance Motors Europe S.r.l., Moncalieri (Turin) (IT)

( * ) Notice: Subject to any disclaimer, the term of this patent is extended or adjusted under 35 U.S.C. 154(b) by 37 days.

(21) Appl. No.: 11/628,094

(22) PCT Filed: May 25, 2005

(86) PCT No.: PCT/EP2005/052399

§ 371 (c)(1),
(2), (4) Date: Nov. 29, 2006

(87) PCT Pub. No.: WO2005/117247

PCT Pub. Date: Dec. 8, 2005

(65) Prior Publication Data

US 2007/0273323 A1  Nov. 29, 2007

(30) Foreign Application Priority Data

May 31, 2004  (IT) .......................... TO2004A0366

(51) Int. Cl.
*H02P 1/46* (2006.01)
(52) U.S. Cl. .................... 318/720; 318/717; 318/727
(58) Field of Classification Search ............... 318/727, 318/720, 717
See application file for complete search history.

(56) References Cited

U.S. PATENT DOCUMENTS

| 5,434,491 | A  | * | 7/1995  | Marioni | 318/700 |
| 5,675,226 | A  | * | 10/1997 | Riola'  | 318/400.41 |
| 6,114,827 | A  | * | 9/2000  | Alvaro  | 318/717 |
| 6,806,670 | B2 | * | 10/2004 | Kusaka  | 318/437 |

* cited by examiner

*Primary Examiner*—Walter Benson
*Assistant Examiner*—Antony M Paul
(74) *Attorney, Agent, or Firm*—Harness, Dickey & Pierce, P.L.C.

(57) ABSTRACT

The drive circuit (10) includes a processing and control circuit (14) comprising a protection circuit (16), designed to generate at its output a logical inhibiting signal (C) starting from every zero crossing of the motor supply volts (V), the inhibiting signal (C) having a predetermined duration ($t_o$) which is less than a quarter of the period of the supply voltage (V); and an enabling circuit (17), connected to a sensor of the position of the rotor (6) and designed to enable a first and a second controlled conduction device (12, 13) associated with the stator winding (4) to conduct current alternately, in synchronization with the signal (H) supplied by the position sensor (6). The enabling circuit (17) is connected to the protection circuit (16) in such a way that the conduction of current through the controlled conduction device (12, 13) enabled at any time is inhibited for the duration ($t_o$) of the inhibiting (C).

5 Claims, 3 Drawing Sheets

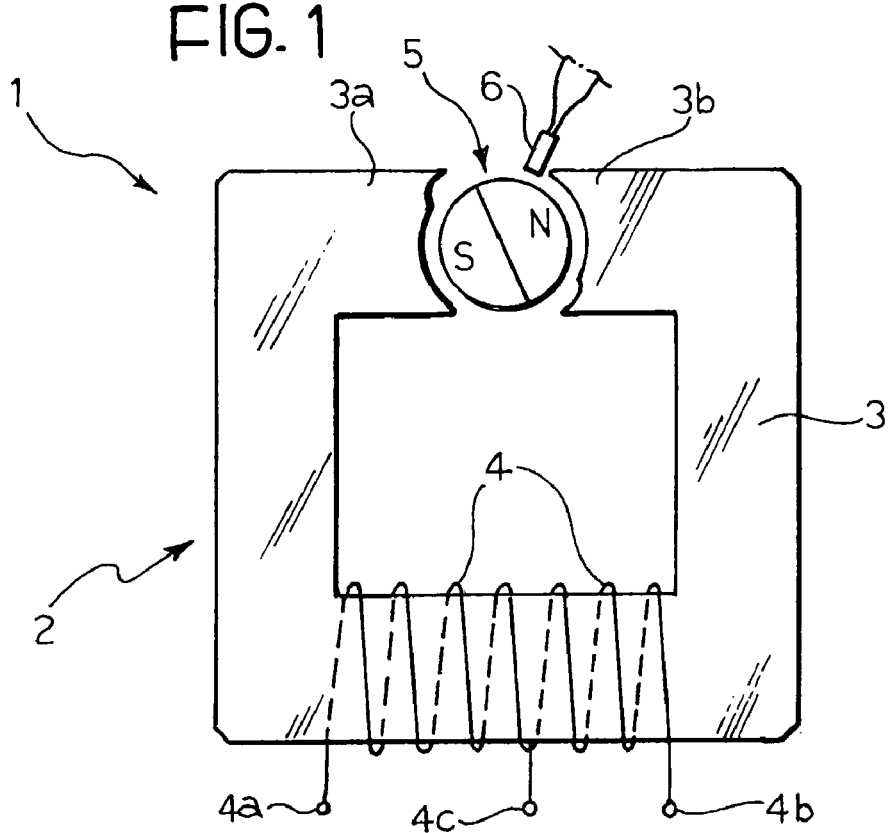
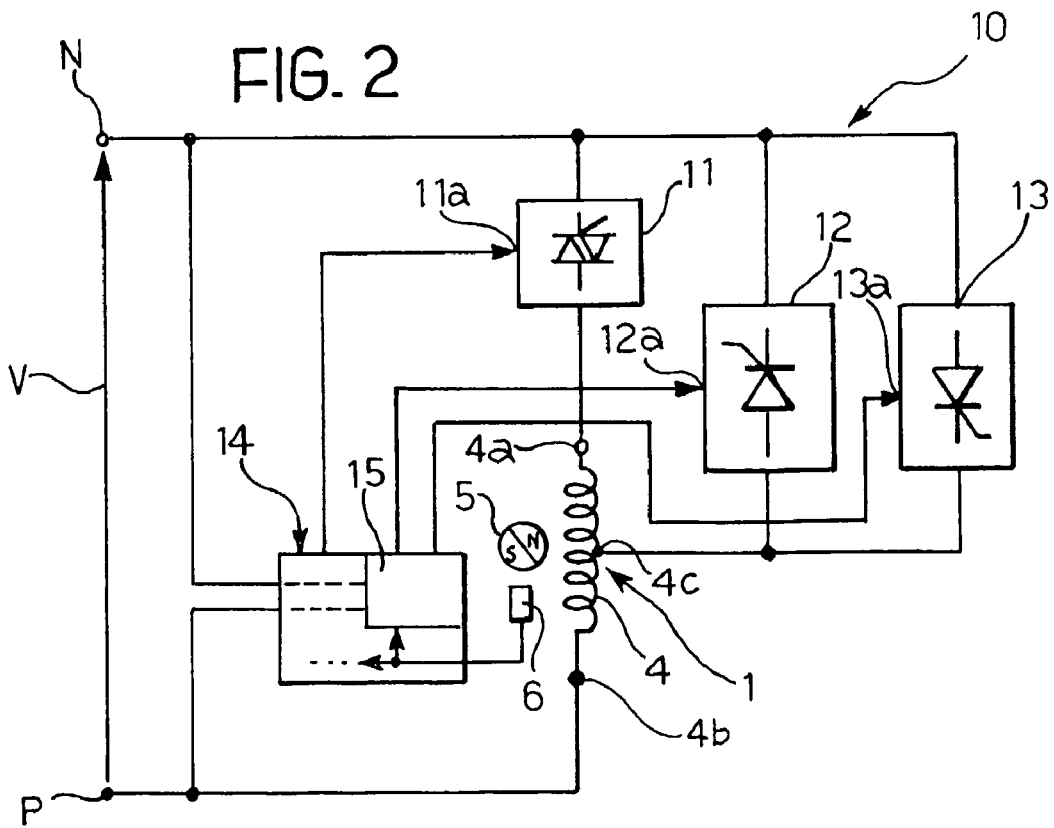

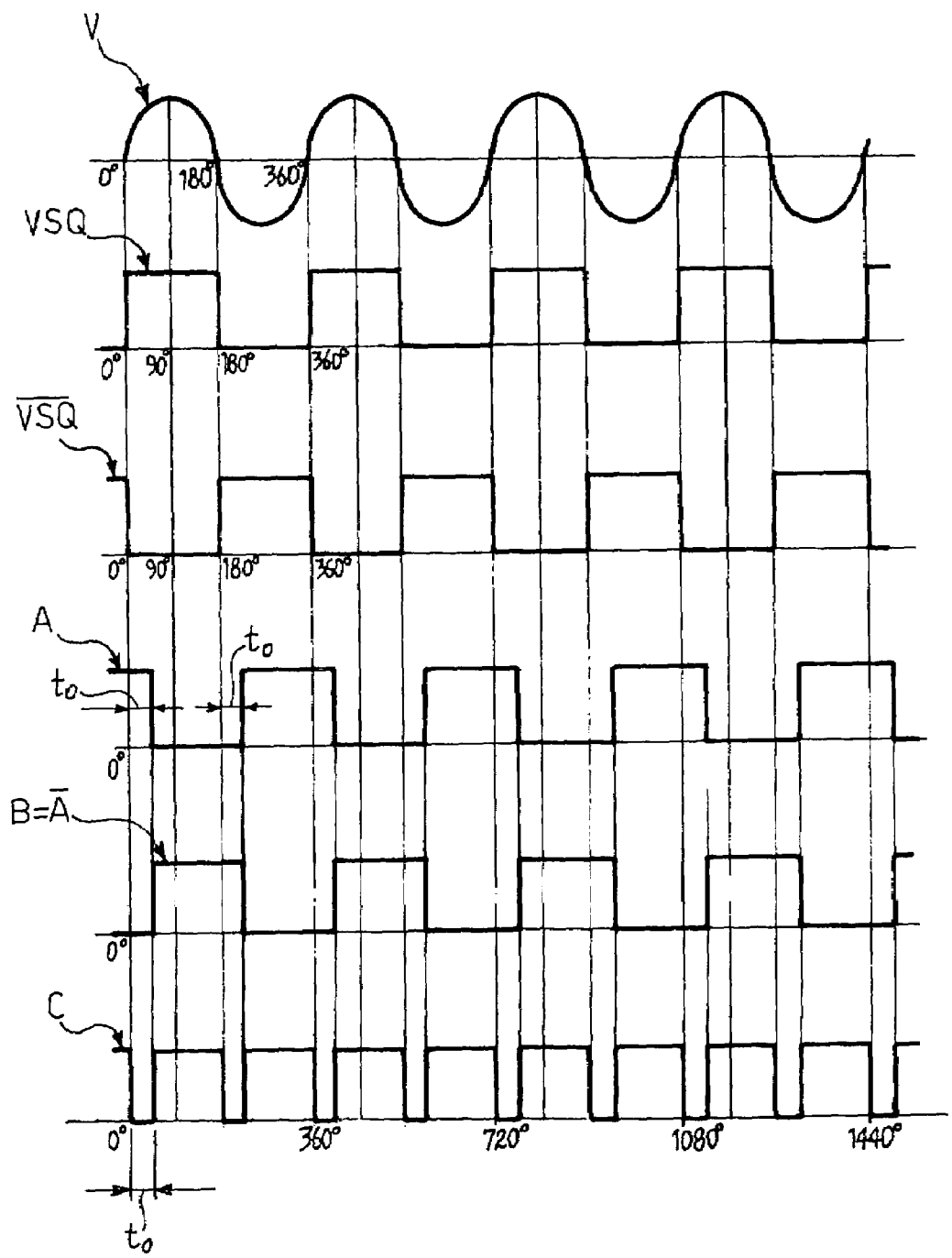

DRIVE CIRCUIT FOR A SYNCHRONOUS ELECTRIC MOTOR

The present invention relates in a general way to a drive circuit for a synchronous electric motor.

In particular, the invention relates to a drive circuit for a synchronous electric motor supplied with the voltage provided by an alternating current power source, including
  a stator with at least one winding, and
  a permanent magnet rotor, associated with position sensor means for supplying an electrical signal essentially in the form of a square wave.

More specifically, the invention relates to a drive circuit comprising
  means of controlling the conduction of current, connected essentially in series with at least part of the stator winding between the terminals of the aforesaid power source, and comprising a first and a second controlled unidirectional conduction electronic device, in antiparallel connection with each other, with corresponding control inputs; and
  processing and control circuit means, connected to the said position sensor means and to the said power source, and designed to control in predetermined ways the control inputs of the said controlled unidirectional conduction devices.

When a synchronous electric motor is started, it is desirable for the current flowing in the stator winding to quickly reach a high level, in order to enable a high torque to be developed in a short time during acceleration, so that the condition of synchronism with the supply voltage can be reached quickly. On the other hand, the current supplied to the stator winding must not reach an excessively high level, since this would entail the risk of causing the demagnetization of the permanent magnets of the rotor.

One object of the present invention is therefore to provide a drive circuit which is simple and economical to produce and which enables the stator current to be controlled in such a way as to avoid the risk of demagnetization of the rotor magnets.

This and other objects are achieved according to the invention with a drive circuit of the type specified above, characterized in that the aforesaid circuit means for processing and control comprise
  protective circuit means, designed to generate at their output a logical inhibiting signal starting at every zero crossing of the supply voltage, the inhibiting signal having a predetermined duration which is less than a quarter of the period of the supply voltage, and
  enabling circuit means, connected to the aforesaid position sensor means and designed to enable the first and second unidirectional conduction devices alternately to conduct current, in synchronization with the square-wave signal supplied by the aforesaid position sensor means;
  the said enabling circuit means being connected to the protective circuit means in such a way that the conduction of current through the unidirectional conduction device enabled at any time is inhibited for the duration of the said inhibiting signal.

Further characteristics and advantages of the invention will be made clear by the following detailed description, provided purely by way of example and without restrictive intent, with reference to the attached drawings, in which:

FIG. 1 is a schematic illustration of the structure of a synchronous electric motor with permanent magnet rotors;

FIG. 2 is a block circuit diagram of a drive circuit for a synchronous motor of the type shown in FIG. 1;

FIG. 4 is a set of diagrams showing the waveforms of some signals generated during the operation of the circuit according to FIG. 3.

Figure 3:
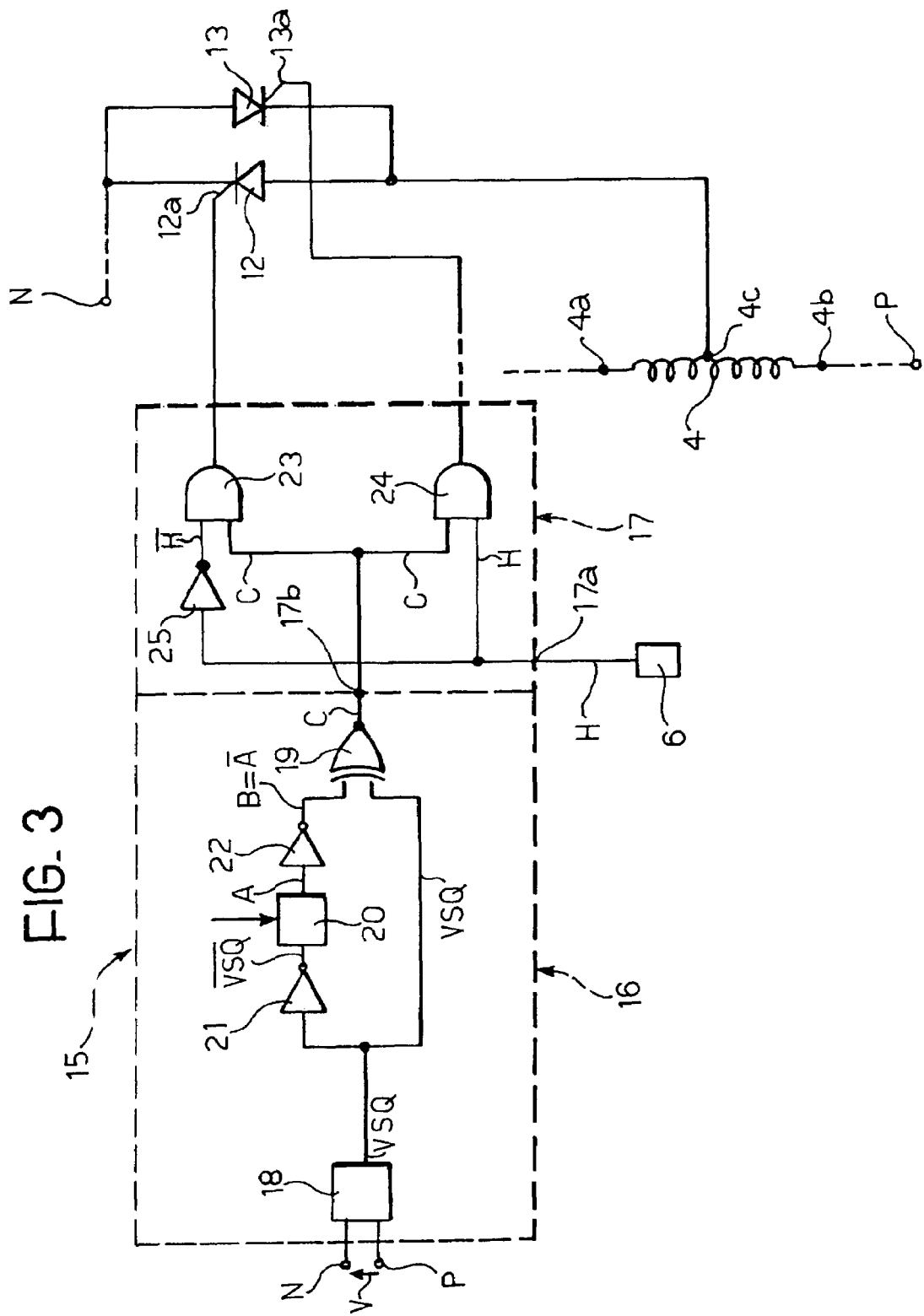
FIG. 3 is a detailed circuit diagram showing part of a drive circuit according to the present invention.

In FIG. 1, the number 1 indicates the whole of an alternating current synchronous electric motor. This motor comprises, in a known way, a stator 2 including a pack of magnetic laminations 3, shaped essentially in the form of a letter C. The stator 2 also comprises a winding 4, positioned around a portion of the pack of laminations 3. In the illustrated embodiment, the stator winding 4 has two end terminals 4a and 4b and an intermediate terminal or tap 4c.

A permanent magnet rotor 5 is mounted rotatably between the ends 3a and 3b of the stator lamination pack 3.

In the illustrated embodiment, the rotor 5 comprises two magnetic poles. Additionally, the gap created between the essentially cylindrical surface of the rotor 5 and the facing surfaces of the pole ends 3a and 3b of the stator is formed (in a known way) with a non-uniform size, to ensure sufficient starting torque for the motor.

An electrical position sensor associated with the rotor 5 of the motor is indicated by the number 6 in FIG. 1. During operation, this sensor, which is placed in a stationary position, can supply a square-wave signal which is synchronous with the rotation of the rotor 5.

The sensor 6 is, for example, a Hall effect sensor.

In FIG. 2, the number 10 indicates the whole of a drive circuit for a synchronous electric motor of the type described above. The circuit 10 comprises two supply terminals N, P, designed to be connected to an alternating current power source, such as the ordinary electrical mains at 50 (60) Hz.

In the embodiment shown by way of example, the drive circuit 10 comprises a triac 11, connected in series with the stator winding 4, between the supply terminals N, P.

The drive circuit 10 also comprises a first and a second controlled unidirectional electronic switching device, indicated by 12 and 13, in antiparallel connection with each other, between the supply terminal N and the intermediate terminal or tap 4c of the stator winding 4.

The devices 12 and 13 are, for example, Silicon Controlled Rectifiers (SCRs), and have control (gate) inputs indicated by 12a and 13a respectively.

In FIG. 2, the number 14 indicates the whole of a processing and control circuit, which has two input terminals connected to the supply terminals N and P.

The circuit 14 has a further input connected to the position sensor 6 associated with the rotor 5, an output connected to the control terminal or input of the triac 11, and two further outputs connected to the control inputs 12a, 13a of the controlled unidirectional conduction devices 12 and 13.

The processing and control circuit 14 also comprises a logic circuit indicated as a whole by 15 in FIGS. 2 and 3. During operation, this logic circuit drives the control inputs 12a, 13a of the unidirectional conduction devices 12 and 13, as a function of the signal supplied by the position sensor 6, and of the zero crossings of the supply voltage applied between the terminals N and P.

As can be seen in the example of embodiment illustrated in detail in FIG. 3, the circuit 15 essentially comprises a protection circuit 16, and an associated enabling circuit 17.

The protection circuit 16 comprises a squaring circuit 18 which receives the supply voltage V at its input. The circuit 18 is, in particular, a detector of the zero crossings of the voltage V, and supplies at its output a square-wave signal VSQ, whose variation is shown by way of example in the second graph from the top in FIG. 4, under the top graph which shows the variation of the supply voltage V.

The output of the circuit 18 is connected directly to a first input of an EX-NOR circuit 19.

The output of the circuit 18 is also connected to an inhibiting signal generating device 20, via an inverter 21.

The device 20 receives at its input a signal $\overline{VSQ}$ whose variation is essentially the inverse of that of the signal VSQ, as shown in the third graph from the top in FIG. 4. This device 20, which for example is a monostable circuit, supplies at its output a square-wave signal indicated by A in FIGS. 3 and 4, whose leading and trailing switching edges are delayed by a time $t_0$ with respect to the corresponding edges of the signal $\overline{VSQ}$.

The output of the device 20 is connected to a second input of the EX-NOR circuit 19 via a further inverter indicated by 22 in FIG. 3. During operation, therefore, a signal indicated by B, identical to the negated signal A, is present at this further input of the EX-NOR circuit 19.

The signal at the output of the EX-NOR circuit 19 is indicated by C in FIGS. 3 and 4.

As is explained more fully below, the signal C appearing at the output of the protection circuit 16 is an inhibiting signal, which can inhibit the outputs of the enabling circuit 17 for successive time intervals each with a duration of $t_0$.

The enabling circuit 17 has a first input 17a connected to the position sensor 6 associated with the rotor 5 of the motor, and a second input 17b connected to the output of the EX-NOR circuit 19.

The enabling circuit 17 is designed to enable the two controlled unidirectional conduction devices 12 and 13 to conduct current alternately, in synchronism with the square-wave signal H supplied by the position sensor 6.

In the embodiment shown by way of example in FIG. 3, the enabling circuit 17 comprises two AND gates, indicated by 23 and 24, each having one input connected to the output of the EX-NOR circuit 19, and a second input connected to the position sensor 6, through an inverter 25 in the case of the gate 23 and directly in the case of the gate 24.

In operation, the signal H supplied by the position sensor 6 determines which of the two unidirectional conduction devices 12 and 13 can conduct current at each instant. On the other hand, the protection circuit 16, by means of its inhibiting signal C, determines the delay after which the flow of current starts in the controlled conduction device 12 or 13 whenever it is enabled (and consequently in the stator winding) with respect to the last zero crossing of the supply voltage V.

This delay, which, with reference to FIG. 4, has previously been indicated by $t_0$, is conveniently less than one quarter of the period of the supply voltage. It can also be constant, and therefore fixed, or can be made to decrease with time, in predetermined ways, during the initial acceleration of the motor, in order to prevent incorrect switching which might cause negative mechanical torque to be generated.

In any case, the minimum value of the delay time $t_0$ is selected in such a way that the current flowing in the motor 1 is such that it does not create any risk of demagnetization of the rotor magnets.

In the example of embodiment described above with reference to FIGS. 2 to 4, the drive circuit 10 is of the particular type in which, on starting, the triac 11 is initially disabled, and current is supplied through the unidirectional conduction devices 12 and 13 to the portion of the stator winding 4 located between the terminals 4b and 4c only. Because of this arrangement, the flow of current is opposed by a lower impedance during the starting phase of the motor, and the current can reach higher levels.

At the end of the starting phase, the current can be made to flow through the whole stator winding 4, because the triac 11 is driving the motor.

However, the principles of the solution according to the invention, as described above, are also applicable to drive circuits in which the triac 11 is not present, and in which the whole stator winding is driven, even in the initial starting phase of the motor, through the two controlled conduction devices in antiparallel connection.

Clearly, provided that the principle of the invention is retained, the forms of application and the details of construction can be varied widely from what has been described and illustrated purely by way of example and without restrictive intent, without thereby departing from the scope of protection of the invention as defined by the attached claims.

The invention claimed is:

1. Drive circuit (10) for a synchronous electric motor (1) supplied with the voltage (V) provided by an alternating current power source and including a stator (2) with at least one winding (4), and a permanent magnet rotor (5), associated with position sensor means (6) for supplying an electrical signal (R) essentially in the form of a square wave; the drive circuit (10) comprising: means of controlling the conduction of current (11-13), connected essentially in series with at least part of the stator winding (4) between the terminals (N, P) of the said power source, and comprising a first and a second controlled unidirectional conduction electronic device (12, 13), in antiparallel connection with each other, with corresponding control inputs (12a, 13a); and processing and control circuit means (14), connected to the said position sensor means (6) and to the said power source, and designed to control in predetermined ways the said means of controlling the conduction of current (11-13); the drive circuit (10) being characterized in that the said processing and control circuit means (14) comprise protective circuit means (16), designed to generate at their output a logical inhibiting signal (C), starting at every zero crossing of the motor supply voltage (V), the inhibiting signal (C) having a specified duration ($t_0$) which is less than a quarter of the period of the said supply voltage (V); and enabling circuit means (17), connected to the said position sensor means (6) and designed to enable the first and second controlled conduction devices (12, 13) alternately to conduct current, in synchronization with the square-wave signal (H) supplied by the said position sensor means (6); the said enabling circuit means (17) being connected to the protective circuit means (16) in such a way that the conduction of current through the controlled conduction device enabled at any time (12, 13) is inhibited for the duration ($t_0$) of the said inhibiting signal (C).

2. Drive circuit according to claim 1, in which the said protective circuit means are designed to generate at their output an inhibiting signal (C), whose duration ($t_0$), starting from each zero crossing of the supply voltage (V), decreases with time in predetermined ways.

3. Drive circuit according to any one of the preceding claims, in which the said enabling circuit means (17) comprise a pair of AND devices (23, 24), each having a first input connected to the output of the protective circuit means (16), and a second input connected to the output of the said position sensor means (6), directly in one case and through a logical inverter (25) in the other case.

4. Drive circuit according to any one of the preceding claims, in which the said protective circuit means comprise a circuit for detecting the zero crossings (18) of the supply voltage (V) applied to the motor (1) during operation, the output of this circuit being connected to a first and a second input of an EX-NOR logic circuit (19), directly in one case and through a circuit comprising a delay device (20) in the other case.

5. Drive circuit according to any one of the preceding claims, in which the said protective circuit means (16) comprise a squaring circuit (18) which squares the motor supply voltage (V) whenever this voltage (V) is other than zero, in advance of or after each zero crossing of the said supply voltage (V).

* * * * *